J. MILLER, Jr.
Securing Wheels on Axles.
No. 70,594.  Patented Nov 5, 1867.
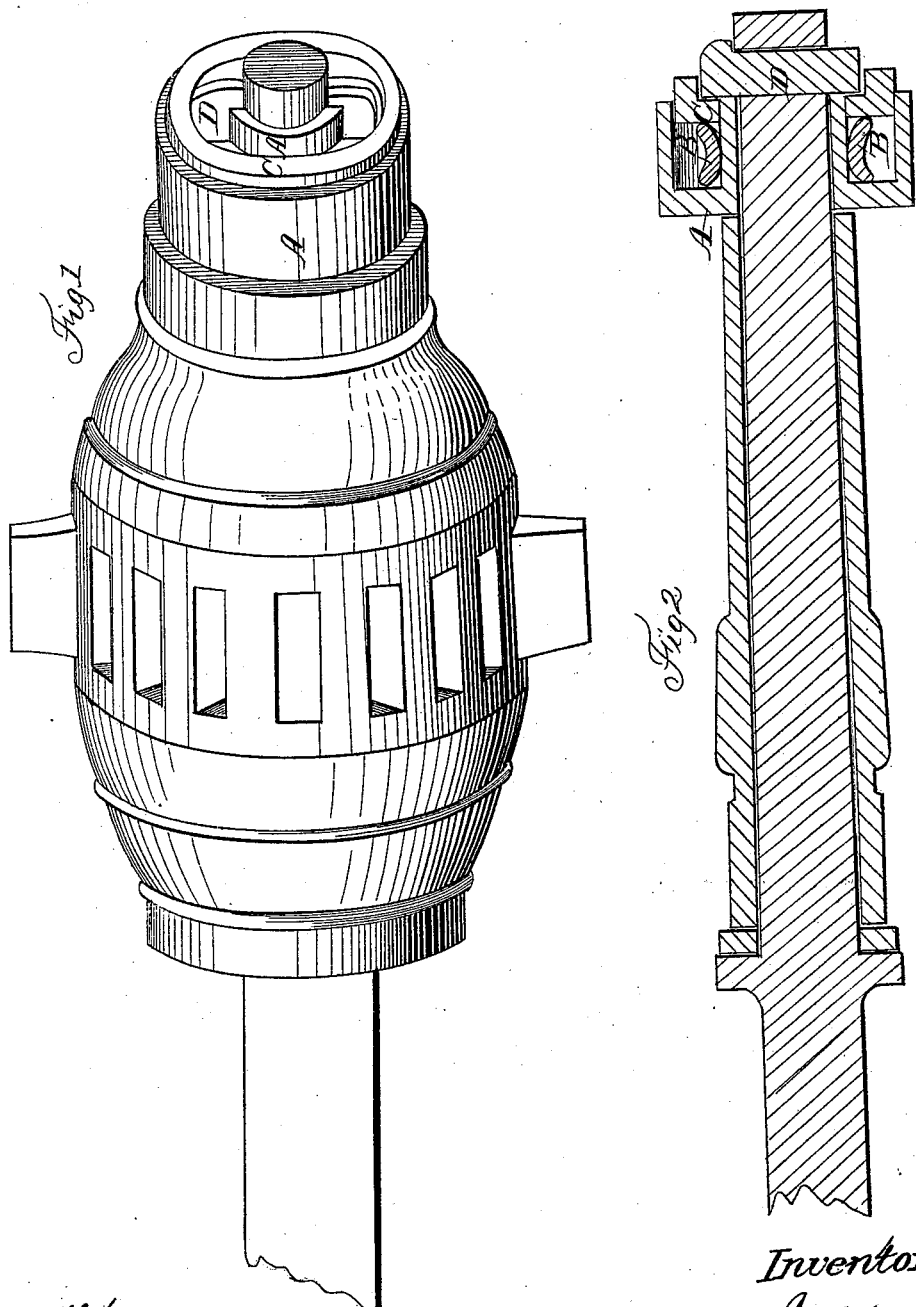

J. MILLER, JR., OF BALTIMORE, MARYLAND.

Letters Patent No. 70,594, dated November 5, 1867.

---

IMPROVEMENT IN MODE OF SECURING WHEELS ON AXLES.

---

The Schedule referred to in these Letters Patent and making part of the same.

---

Be it known that I, J. MILLER, jr., of the city of Baltimore, and State of Maryland, have invented a new and useful Improvement in the Mode of Securing Wheels on Axles; and I do hereby declare that the following is a full, clear, and exact description of the construction and operation of the same, reference being had to the annexed drawings, making a part of this specification, in which—

Figure 1 is a perspective view, and

Figure 2 a cross-sectional view—

And which consists of a box marked A, which forms a washer, is hollow, and fits on the axle, and contains a spring marked B, composed of gum or other substance, a plate marked C fitting in the front of box A, and pressed forward by the spring B, said plate having a rim or flange, which projects over a linchpin marked D, and retains it in the axle, by which arrangement the wheel is securely held in the axle. The linchpin D is inserted or removed by pressing back the plate C.

I do not claim the invention of a linchpin for securing wheels on axles.

What I claim as my invention, and desire to secure by Letters Patent, is—

The combination of the box A, spring B, plate C, and the linchpin D, or their equivalents, operating in the manner described and for the purposes substantially as set forth.

Baltimore, February 6, 1867.

J. MILLER, JR.

Witnesses:
A. M. STOUT,
ALEX. MAHON.